(12) United States Patent
Little

(10) Patent No.: US 8,478,083 B2
(45) Date of Patent: Jul. 2, 2013

(54) MULTI-STAGE POLARIZATION ROTATOR

(75) Inventor: Brent E. Little, Glen Head, NY (US)

(73) Assignee: Infinera Corporation, Sunnyvale, CA (US)

( * ) Notice: Subject to any disclaimer, the term of this patent is extended or adjusted under 35 U.S.C. 154(b) by 628 days.

(21) Appl. No.: 12/647,039

(22) Filed: Dec. 24, 2009

(65) Prior Publication Data

US 2011/0158579 A1    Jun. 30, 2011

(51) Int. Cl.
*G02B 6/00* (2006.01)
(52) U.S. Cl.
USPC .......................................................... 385/11
(58) Field of Classification Search
USPC .......................................................... 385/11
See application file for complete search history.

(56) References Cited

U.S. PATENT DOCUMENTS

2011/0150384 A1*   6/2011   Nagarajan et al. .............. 385/11

\* cited by examiner

*Primary Examiner* — Ryan Lepisto
*Assistant Examiner* — Jerry Blevins
(74) *Attorney, Agent, or Firm* — David L. Soltz

(57) ABSTRACT

Consistent with the present disclosure, a rotator is provided that includes multiple stages, each of which including waveplate and delay sections. The waveplate and delay sections each exhibit birefringence and have polarization eigen states that are tilted with respect to each other. The lengths of the delay and waveplate sections are selected such that, for example, a relatively high extinction ratio can be achieved over a relatively wide range of fabrication perturbations to the waveplates or delay sections and over a relatively wide range of wavelengths. Accordingly, the rotator consistent with the present disclosure is more tolerant of deviations in the optical signal polarization.

21 Claims, 13 Drawing Sheets

MULTI-STAGE POLARIZATION ROTATOR

BACKGROUND

Waveplates or rotators (the terms "rotators" and "waveplates" are used interchangeably herein) have been used extensively in optics in order to manipulate a signal's state of polarization. For instance, waveplates are often used to rotate the direction of polarization of an incident optical signal. One specific type of waveplate is the half-wave plate. The half-wave plate rotates an incident polarization state 90°. Another type of waveplate is the quarter-wave plate. The quarter-wave plate converts linearly polarized light into circularly polarized light.

A waveplate includes an optical material or waveguide that exhibits birefringence. A birefringent material or waveguide is one having an effective refractive index that depends on the polarization direction of the optical signal. The birefringent material or waveguide is said to have two principle axes, often called a slow and a fast axis, referring to the axis that have maximum and minimum refractive index respectively.

In order to manipulate the state of polarization, the waveplate is inserted in the optical path, such that an input portion of the optical path (input path) supplies the optical signal to the waveplate and an output portion of the optical path (output path) receives the optical signal from the waveplate. The waveplate's axes are oriented at some angle with respect to the angle of the incident light, or to the principle axis of the input path, which may include a waveguide. The length of the waveplate, along with orientation thereof, will determine the function that the waveplate serves. In many applications, the waveplate will have an orientation of 45° with respect to the principle axis of the input and output paths.

A waveplate may be inserted or fabricated between the input and output paths, or sections. The input and output sections could be waveguides or free space for instance. Likewise the waveplate can be a slab of material or a waveguide structure. The input and output sections could include the same or different waveguide types or materials. If they are different, relatively short identical sections may be inserted in front of, and after, the waveplate. The input and output sections are assumed to have principle axes defined as TE (transverse electric) and TM (transverse magnetic). TE and TM typically refer to the orientations in planar optics where TE is the orientation parallel to the substrate and TM is the orientation perpendicular to the substrate. In free space TE and TM could be replaced by the S and P orientations, which are orientations relative to the laboratory frame. The waveplate has principle axis labeled P1 and P2, where P1 is oriented by angle $\theta$ with respect to the TE axis. In many applications, it is desirable for the angle $\theta$ to be 45°. P1 and P2 are mutually orthogonal, as are TE and TM. An incident signal excites some portion of P1 and P2, and, due to the birefringence, the signal portions on P1 and P2 travel with different phase velocities. At the output of the waveplate, P1 and P2 excite modes TE and TM. The excitation is a phasor and vector sum of P1 and P2. The angle $\theta$ and the length of the waveplate are chosen to achieve some specific functionality relating the input polarization and the output polarization of the optical signal propagating through the waveplate or rotator.

An example of a conventional free space (or slab) waveplate may include a slab of material having two principle axes P1 and P2 which exhibit birefringence, and in which the orientations of P1 and P2 are different than those of the principle axis of the input and outputs paths.

In planar optics, slab waveplates may be incorporated by cutting a slot through the waveguide and then inserting the waveplate. Alternatively, waveplates can be fabricated by modifying the structure of the waveguide along desired sections.

A conventional waveguide may have a rectangular cross section and principle modes that are TE and TM oriented. More generally, waveguides that have some mirror symmetry plane (such as left-right symmetry) will also support TE and TM oriented principle modes. In order to create principle modes that have an orientation tilted with respect to the TE and TM axis an asymmetry may be incorporated into the waveplate or waveguide. Asymmetries might also be induced by changing the refractive index throughout the waveguide or cladding. Asymmetries can create new principle states with orientations tilted with respect to the TE and TM orientations of other conventional symmetric waveguides in a planar optical circuit.

As noted above, a half-wave plate is used to rotate the polarization of an incident signal by 90°. Such a rotator is often referred to as a polarization converter because it converts the incident polarization state into the orthogonal state. For example, in planar waveguides, the TE (or TM) state is converted to a TM (or TE) state. In free space the S (or P) state is converted to a P (or S) state. Typically, a half-wave plate is configured to have the principle axis of the waveplate oriented 45° with respect to the incident signal. For instance, in planar waveguides, the P1 or P2 axis or eigen mode of the waveplate is oriented at 45° with respect to the TE and TM axis or eigen mode of the input and output paths, as shown in FIG. 1. (Note that P1 and P2 are mutually orthogonal, and TE and TM are mutually orthogonal). Further, in the ideal half-wave plate, the length of the plate is chosen such that the cumulated phase difference between the P1 and P2 states accumulates to a phase $\phi$.

Mathematically, the cumulated differential phase difference, $\phi$, between the two polarization eigen states or eigen modes of a waveplate or rotator is:

$$\phi = \frac{2\pi}{\lambda} L(NP1 - NP2) \qquad \text{eq (1)}$$

Where $\lambda$ is the wavelength, L is the plate length, and NP1, NP2 are the effective indexes of the P1 and P2 eigen states, respectively. For a half-wave plate, the L is chosen so that $\phi = \pi$.

In practice, perturbations affect the ideal half-wave plate. For instance, the tilt angle of P1 with respect to TE as shown in FIG. 1 may not be exactly 45°. This is especially prevalent in planar waveguides fabricated waveplates. Random fabrication deviations can lead to deviations D about the target of 45° (see FIG. 1). These deviations lead to deterioration in the performance of the optical circuit or device including the rotator or waveplate.

The performance degradation of a conventional (single-stage) half-wave plate is depicted in the curve or response 200 shown in FIG. 2. The x-axis measures the deviation away from an ideal 45° tilt (measured in degrees), and the y-axis measures the polarization extinction ratio in decibels. The extinction ratio is the ratio of power in the unwanted polarization at the output, to the input power. For instance, if the input signal has a TE orientation, then the output should be a pure TM signal for an ideal half-wave plate. Perturbations or deviations in the tilt of 45° result in some of the output signal remaining in the TE orientation. The extinction ratio is then the power in the TE orientation at the output compared to the net TE power at the input. As shown in FIG. 2, response 200 is highly peaked, implying that small deviations in the input optical signal away from ideal (45°) lead to poor extinction ratio.

Accordingly, a rotator or waveplate is desired that is more tolerant of deviations in an input optical signal polarization away from a desired orientation.

SUMMARY

Consistent with an aspect of the present disclosure, an apparatus is provided that comprises a substrate, and an input waveguide provided on the substrate. The input waveguide receives an optical signal, which has a first polarization. A first waveplate waveguide is also provided on the substrate. The first waveplate waveguide receives the optical signal and has first and second waveplate eigen modes. The first and second waveplate eigen modes are oriented along first and second directions, respectively. A delay waveguide is also provided on the substrate, such that the first waveplate waveguide supplies the optical signal to the first delay waveguide. The delay waveguide having first and second delay eigen modes, which are oriented along third and fourth directions, respectively. A second waveplate waveguide is also provided on the substrate, such that the second waveplate waveguide receives the optical signal from the first delay waveguide. The second waveplate waveguide has the first and second waveplate eigen modes. In addition, an output waveguide is provided on the substrate. The output waveguide supplies the optical signal with a second polarization different than the first polarization in the input waveguide.

Consistent with a further aspect of the present disclosure, an apparatus is provided that comprises a first waveplate slab that receives an optical signal. The first waveplate slab has first and second waveplate eigen modes, which are oriented along first and second directions, respectively. A delay slab is also provided, such that the first waveplate slab supplies the optical signal to the first delay slab. The delay slab has first and second delay eigen modes, which are oriented along third and fourth directions, respectively. A second waveplate slab is additionally provided that receives the optical signal from the first delay slab. The second waveplate slab has the first and second waveplate eigen modes, wherein the second waveplate slab supplies the optical signal with a second polarization different than the first polarization.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the disclosure.

BRIEF DESCRIPTION OF THE DRAWINGS

FIG. 4b illustrates a response associated with the rotator shown in FIG. 4a;

FIG. 6b illustrates a response associated with the rotator shown in FIG. 5a;

DESCRIPTION OF THE EMBODIMENTS

Consistent with the present disclosure, a rotator is provided that includes multiple stages, each of which including waveplate and delay sections. The waveplate and delay sections each exhibit birefringence and have polarization eigen states that are tilted with respect to each other. The lengths of the delay and waveplate sections are selected such that, for example, a relatively high extinction ratio can be achieved over a relatively wide range of fabrication perturbations to the waveplates or delay sections and over a relatively wide range of wavelengths. Accordingly, the rotator consistent with the present disclosure is more tolerant of deviations in the optical signal polarization.

Reference will now be made in detail to the present exemplary embodiments, examples of which are illustrated in the accompanying drawings. Wherever possible, the same reference numbers will be used throughout the drawings to refer to the same or like parts.

Figure 1:
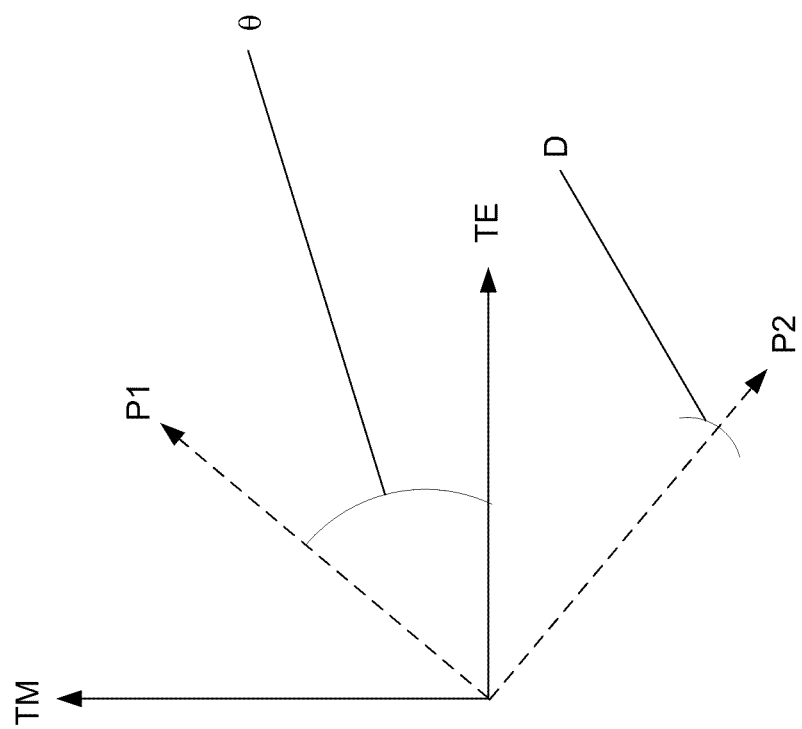
FIG. 1 illustrates TE and TM axes relative to P1 and P2 axes in a conventional waveplate.
Figure 2:
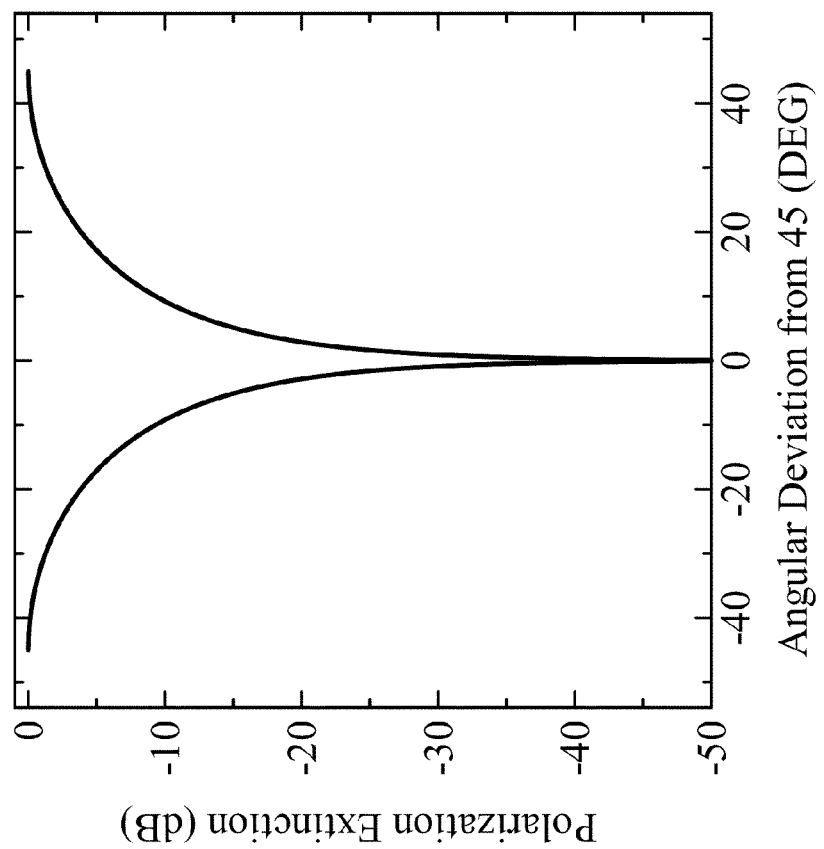
FIG. 2 illustrates a response associated with a conventional waveplate.
Figure 3A:
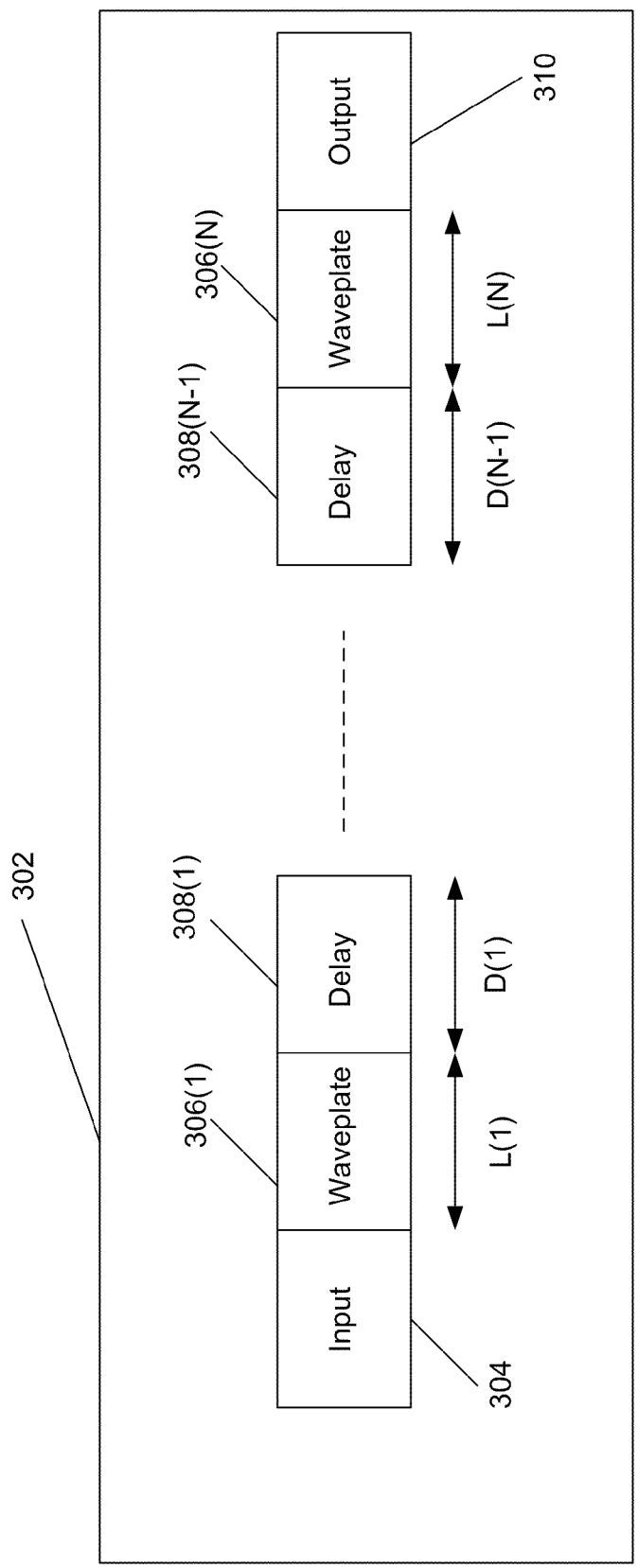
FIG. 3a illustrates a block diagram of a rotator consistent with an aspect of the present disclosure.

FIG. 3a illustrates a rotator 300 consistent with an aspect of the present disclosure. Rotator 300 may include a substrate 302, upon which an input section or waveguide 304 may be provided. Input waveguide 304 may be rectangular in shape, as discussed in greater detail and may be configured to receive an optical signal having a first polarization (e.g., TE or TM). Input waveguide 304 supplies the optical signal to waveplate waveguides 306(1) to 306(N) and delay waveguides 308(1) to 308(N−1) (N being an integer greater than 1). Preferably, the polarization states or eigen modes associated with waveguide 304 are different than that of waveplate waveguides 306(1) to 306(N). Likewise, the polarization states associated with output waveguide 310 are also preferably different than that of waveplate waveguide 306(1) to 306(N). The polarization states or eigen modes of either the input or output waveguide sections, however, may be the same as that of delay waveguides 308(1) to 308(N−1).

Each of waveplate waveguides 306-1 to 306-N have a corresponding one of a plurality of lengths, L(n) where n=1 to N. Length Ln may be characterized equivalently by a physical length or a phase length. Likewise, delay sections or waveguides 308(1) to 308(N−1) are characterized by a physical length or phase length D(n), n=1 to N−1. Each of waveplate waveguides 306(1) to 306(N) may have the same cross-sectional shape extending along the length (L(n)) thereof, i.e., each may have the same construction. In addition, each of each of delay waveguides 308(1) to 308(N−1) may have the same construction. Alternatively, each of waveplate waveguides 306(1) to 306(N−1) may have a different construction from one another, and each of delay waveguides 308(1) to 308(N−1) may have a different construction compared to one another. Each of phase or physical lengths L(n)

may be the same or different from one another, and each of phase or physical lengths D(n) may be the same or different from one another.

Figure 3B:
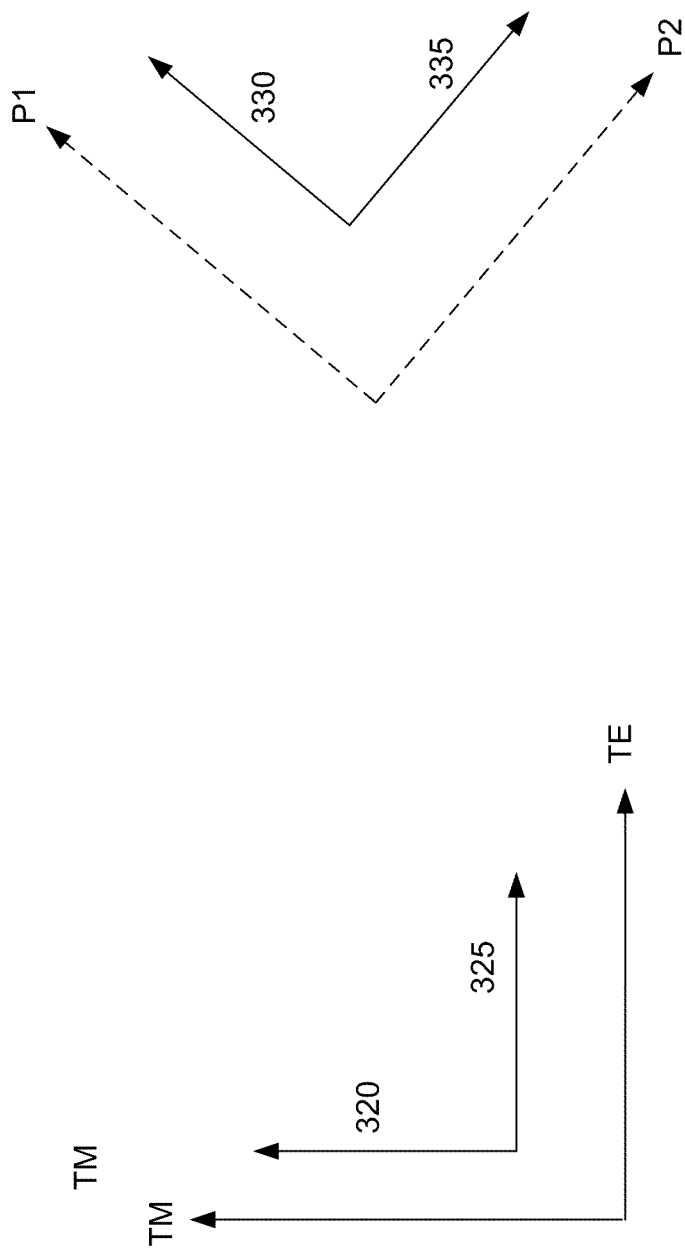
FIG. 3b illustrates TE and TM eigen modes and P1 and P2 eigen modes associated with delay waveguides and waveplate waveguides consistent with the present disclosure.

Waveplate waveguides 306(1) to 306(N) may have polarization eigen states or modes (P1 and P2), which are tilted relative to the eigen modes (TE and TM) of delay waveguides 308(1) to 308(N−1) (see FIG. 3b, such that eigen modes TE and TM extend in directions 320 and 325, respectively, and eigen modes P1 and P2 extend in directions 330 and 335, respectively. As noted above, the input (304) and output (310) waveguides may also have the same eigen modes or polarization states, TE and TM, as delay waveguides 308(1) to 308 (N−1). In one example, if each of waveplate waveguides 306(1) to 306(N) has the same construction, and each of delay waveguides 308(1) to 308(N−1) have the same construction, each of the delay sections may have eigen modes TE and TM ("delay eigen modes"), and each of the waveplate waveguides may have eigen states P1 and P2. After propagating through waveplate waveguides 306(1) to 306(N) and delay waveguides 308(1) to 308(N−1), the optical signal may have a desired polarization that is different than the input polarization. The optical signal is then output with the desired polarization through output waveguide 310.

Each of waveplate waveguides 306(1) to 306(N) and each of delay waveguides 308(1) to 308(N−1) exhibit birefringence. That is, the effective refractive indices of the P1 and P2 polarization eigen modes differ from one another, and the effective refractive indices of the TE and TM polarization eigen modes are different from one another.

Typically, each of delay waveguides 308(1) to 308(N−1) may have the same size, length, and shape. For example, each may have a rectangular cross-section, as shown in FIG. 7 and discussed below. Alternatively, the dimensions of each of delay waveguides 308(1) to 308(N−1) may be different from another, so that the TE and TM refractive indices are also different in each delay waveguide.

As noted above, lengths L(n) and D(n) are selected to provide optimal or improved performance relative to a conventional rotator. An example of rotator that rotates the polarization of an incoming optical signal by 90 degrees, e.g., from a TE polarization to a TM polarization and visa versa, will next be described with reference to FIGS. 4a, 4b, 5a, and 5b.

Figure 4A:
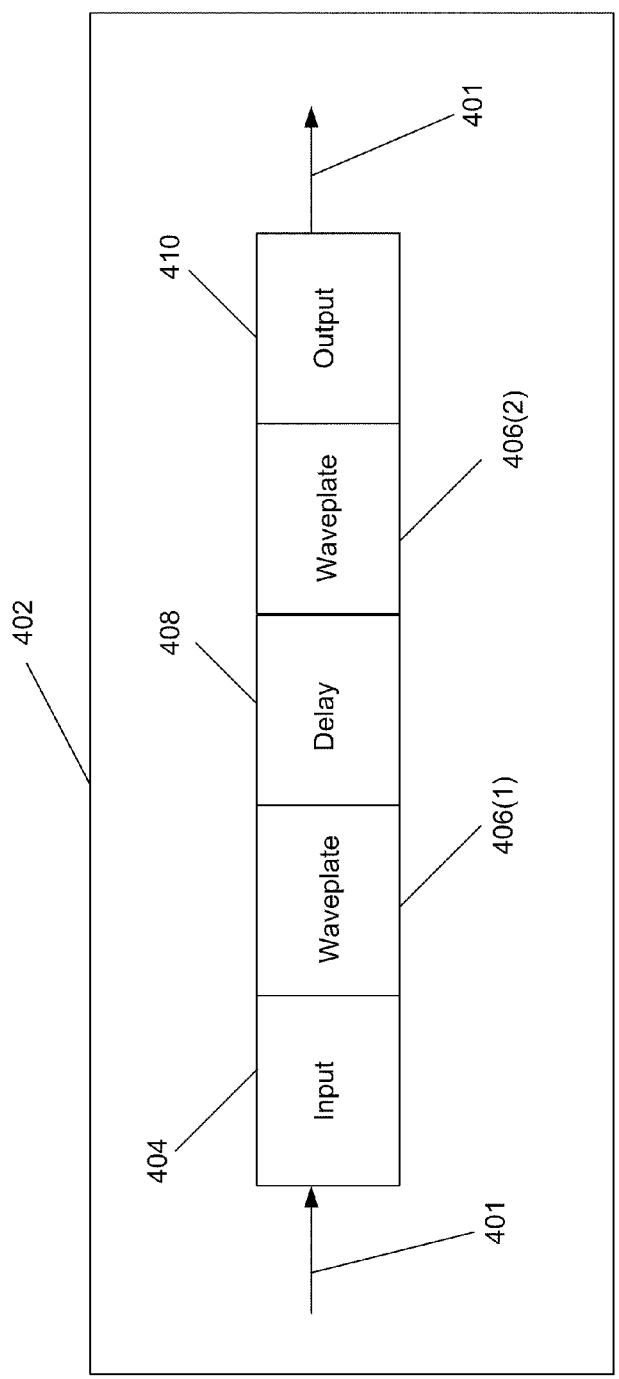
FIG. 4a illustrates a block diagram of an example of a rotator consistent with the present disclosure.

FIG. 4a illustrates a block diagram of rotator 400 provided on substrate 402. Rotator 400 includes input and output waveguides 404 and 410, respectively, which receive and output optical signal 401. In input waveguide 404, the optical signal may have a first polarization (e.g., TE) and, in output waveguide 410, the optical signal may be rotated 90 degrees to have a second polarization (e.g., TM). Alternatively, the optical signal may be input with a TM polarization and rotated to have a TE polarization.

Waveplate waveguide 406(1) has a length L1 or phase length $\phi1=0.5\pi$, and waveplate waveguide 406(2) has a length L2 or phase length $\phi2=1.5\pi$ (the order of the waveguides 406(1) and 406(2) may be reversed). In this example, the delay waveguide 408 has a length L2 or phase length of $\phi_D=p$. Phase length can be converted to physical length by use of equation (1) for both waveplate waveguides 406(1) and 406(2) and delay waveguide 408. The eigen modes in waveplate waveguides 406(1) and 406(2) are configured to have nominal tilt angles of 45° with respect to the eigen modes in the input (404), output (410), and delay (408) waveguides.

Figure 4B:
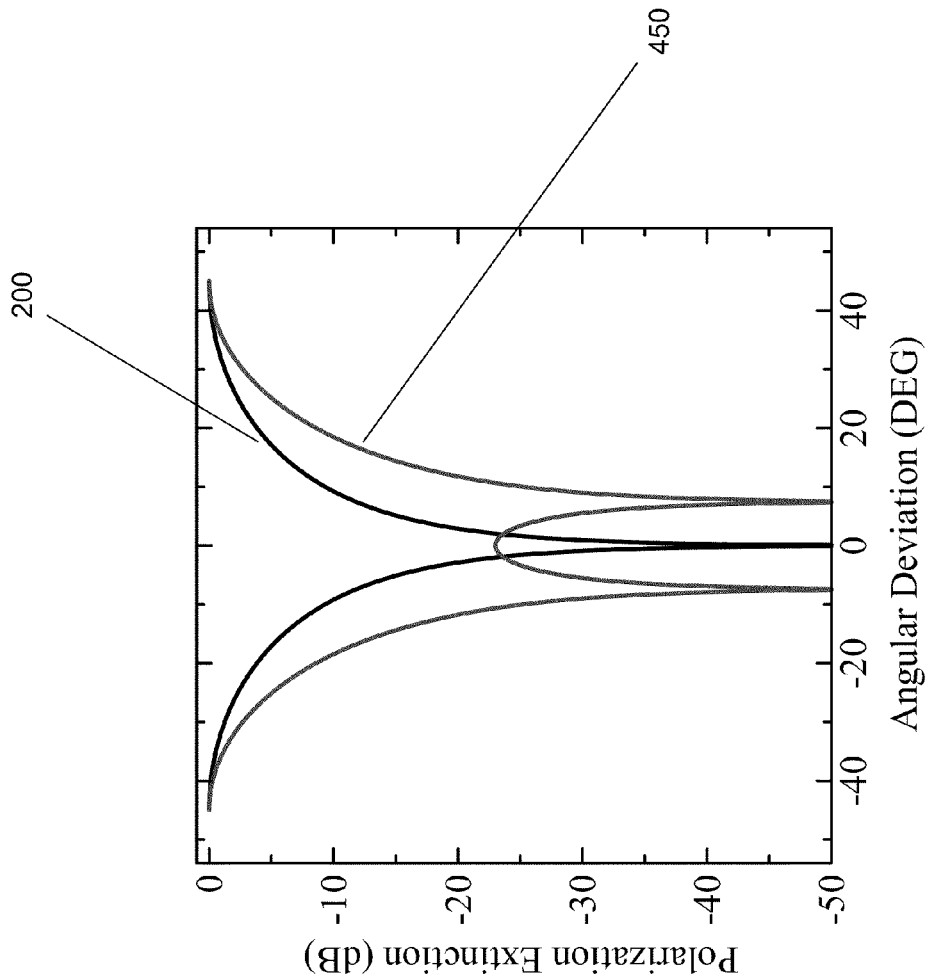

In FIG. 4b, response 200 of a conventional rotator is superimposed with response 450 associated with rotator 400. By way of example, an angular deviation (of 5 degrees) of the TE and TM eigen modes relative to the P1 and P2 eigen modes away from the preferred angle of 45 degrees results in a polarization extinction of approximately −15 dB if the conventional rotator discussed above is employed. On the other hand, a significantly lower polarization extinction of approximately −30 db may be obtained at the same angular deviation with rotator 400. Thus, the two-stage rotator shown in FIG. 4a can tolerate larger deviations in angle away from 45 degrees and still maintain a high polarization extinction.

Figure 5:
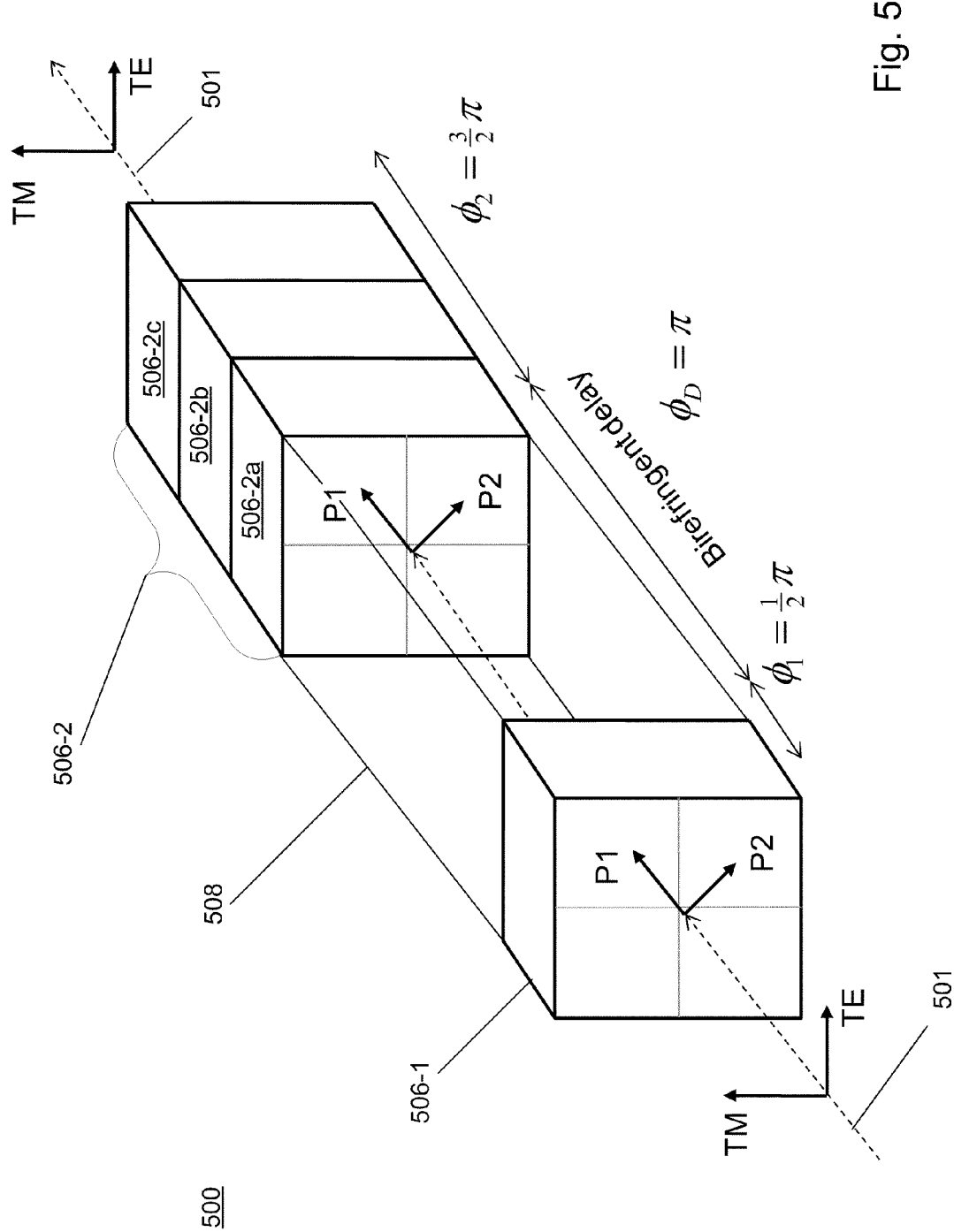
FIG. 5 illustrates an example of a free space rotator consistent with a further aspect of the present disclosure.

FIG. 5 illustrates an example of a rotator 500, which is a "free space" implementation of the 2-stage polarization rotator shown in FIG. 4a. Rotator 500 includes waveplate slab 506(1), which may be a slab quarter-wave plate (phase length, $\phi1=0.5\pi$), and waveplate slab 506(2) having phase length $\phi2=(3/2)\pi$. Waveplate slab 506(2) may be implemented as a series of stacked quarter-wave plate slabs 506(2a), 506(2b), and 506(2c), each of which having a phase length of $\pi/2$. Delay section 508 should preferably include birefringent material in order to realize a $\pi$ differential phase change between the eigen modes of that section.

As further shown in FIG. 5 optical signal 501 input to slab 506(1) may have the polarization shown, and after propagating through slabs 506(1), 506(2), and 508, is output with a rotated polarization. The orientations of the eigen modes in slabs 506(1), 506(2), and 508 is similar or the same as that of above-described waveguides 406(1), 406(2), and 408, respectively.

Figure 6A:
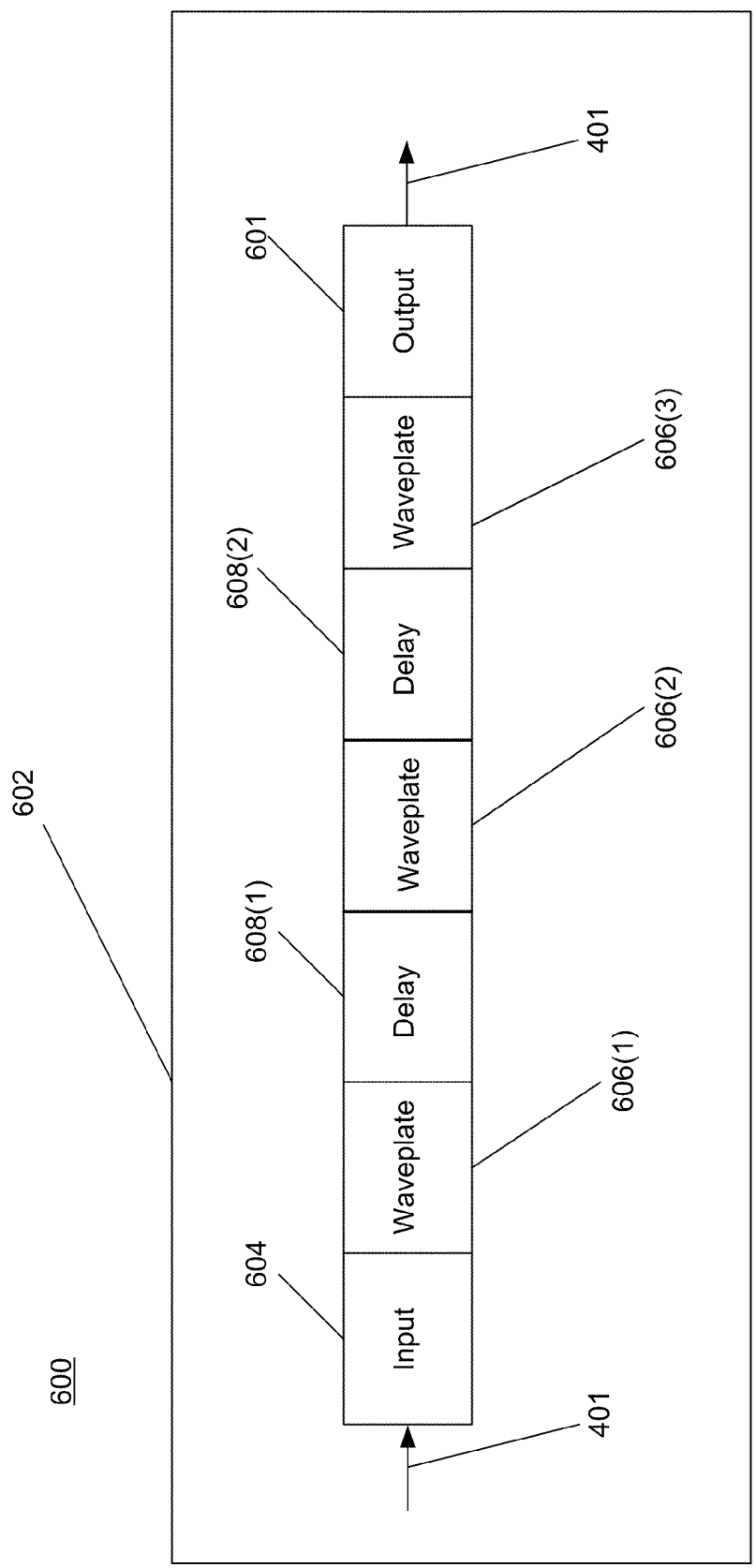
FIG. 6a illustrates another example of a rotator consistent with an aspect of the present disclosure.

Further improvement to rotator 200 can be achieved by adding additional stages, for example, as in rotator 600, which is shown in FIG. 6a. Rotator 600 includes input waveguide 604 and output waveguide 610, which receive and output an optical signal, respectively. The output optical signal, as noted above, is rotated, in this example, by 90 degrees (either TE to TM or TM to TE). Rotator 600 further includes waveplate waveguides 606(1) to 606(3) and delay waveguides 608(1) and 608(2) that have various phase and or physical lengths so that the input polarization is rotated by a desired amount in output waveguide 610. In particular, the phase lengths of waveplate waveguides 606(1), 606(2), and 606(3) are, for example, $\phi1=0.5\pi$, $\phi2=\pi$, $\phi3=1.5\pi$, and the phase lengths of delay waveguides 608(1) and 608(2) are, for example, $\phi d1=d2=\pi$.

Figure 6B:
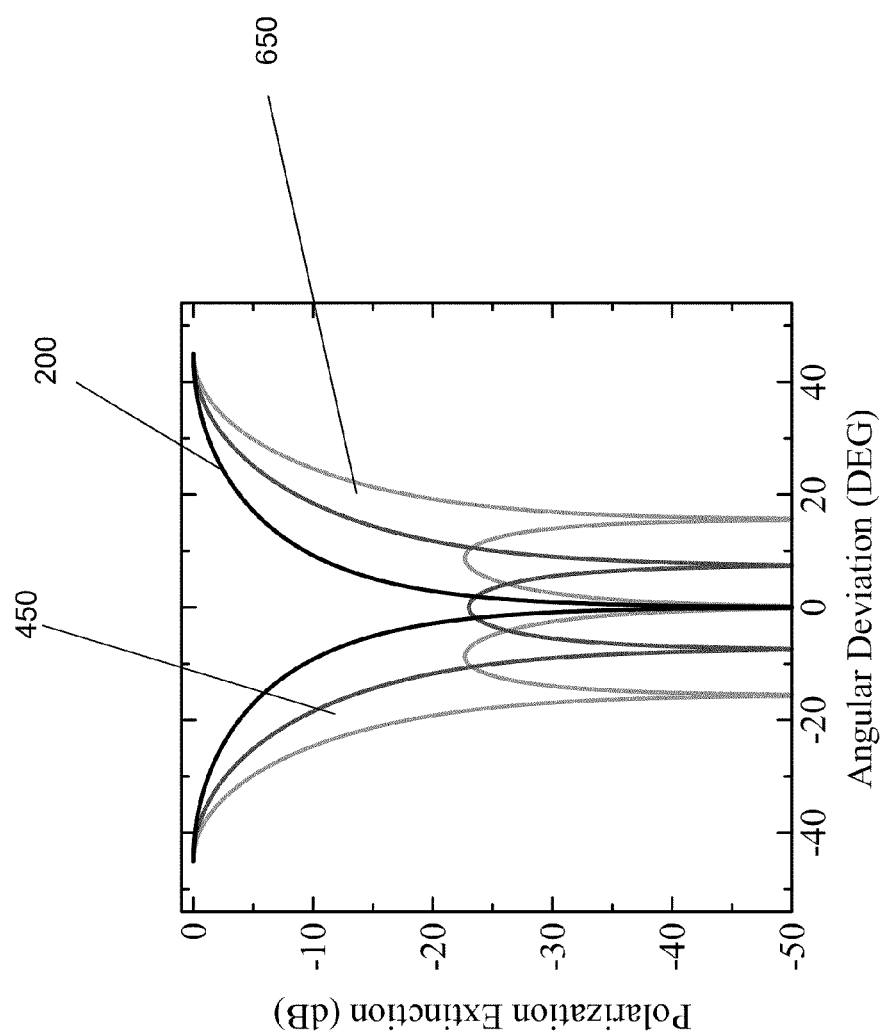

In FIG. 6b, response 200 of a conventional rotator is superimposed with response 450 associated with rotator 400 and response 650 associated with rotator 600. As noted above and by way of example, an angular deviation (of 5 degrees) of the TE and TM eigen modes relative to the P1 and P2 eigen modes away from the preferred angle of 45 degrees results in a polarization extinction of approximately −15 dB if the conventional rotator discussed above is employed. On the other hand, a significantly higher polarization extinction of approximately −30 db may be obtained at the same angular deviation with rotators 400 and 600. As shown in FIG. 6b, however, response 600 has relatively higher extinction over a wider range of angular deviations than response 400. For example, response 600 yields a polarization extinction of −25 dB or less can be achieved for angular deviations of about ±20 degrees, whereas such polarization extinction can be achieved over a narrower range of about ±10 degrees of angular deviation. Thus, by adding more stages, performance at deviations away from the nominal target angle of 45° improves. That is, the robustness of the polarization rotator improves.

Figure 7A:
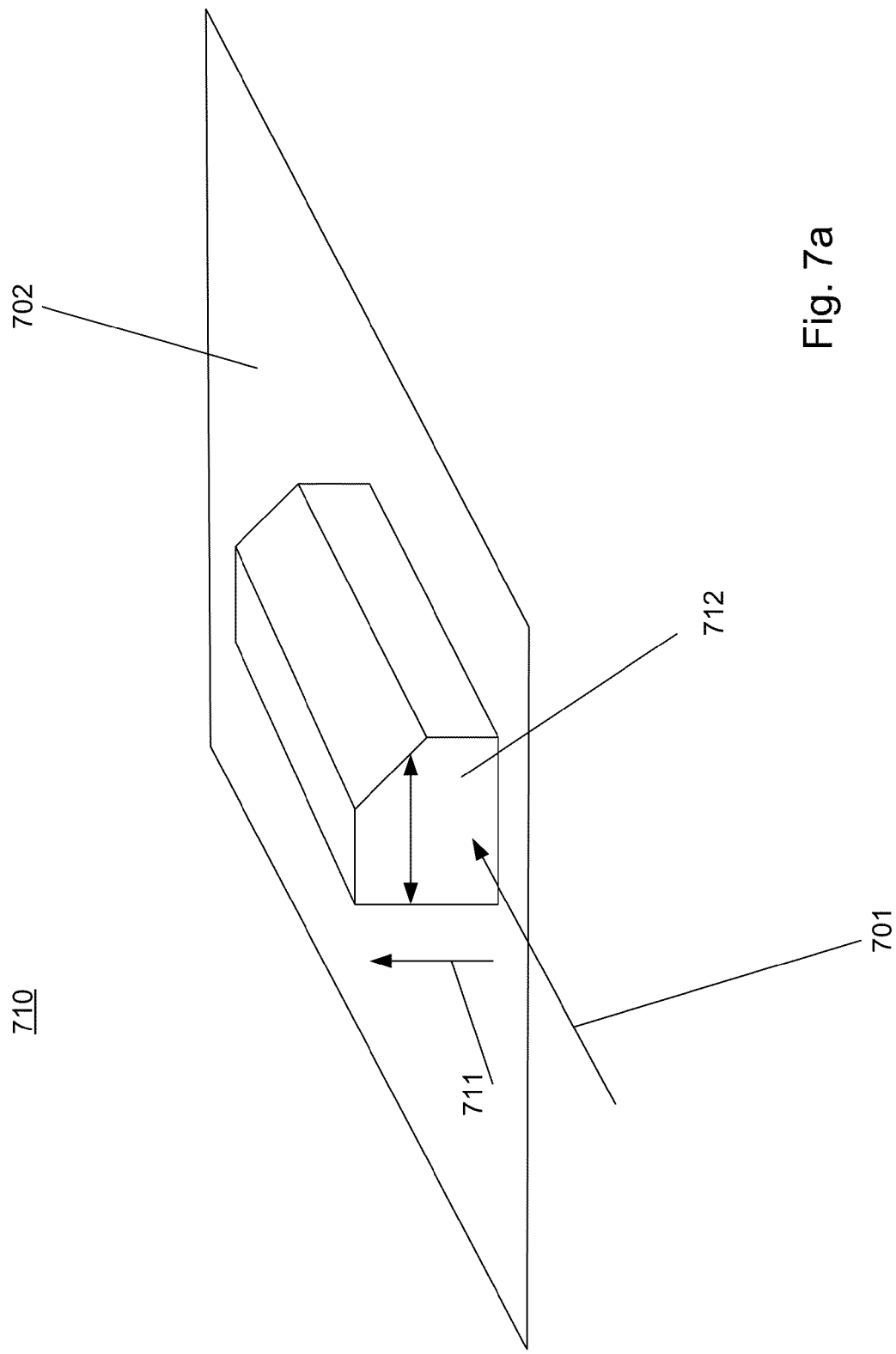
FIGS. 7a-7c illustrate perspective views of waveplate sections consistent with an additional aspect of the present disclosure.
Figure 7B:
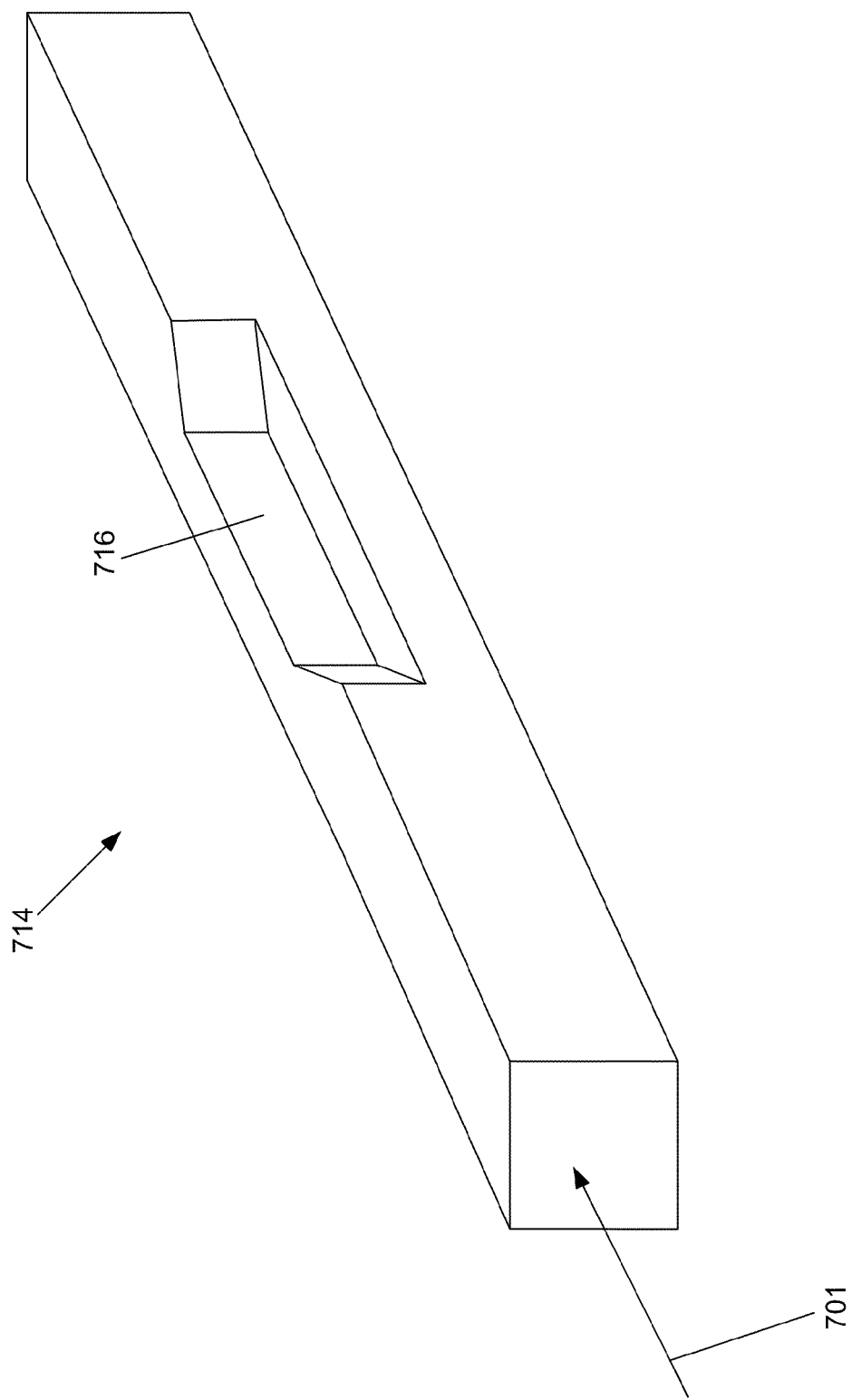
Figure 7C:
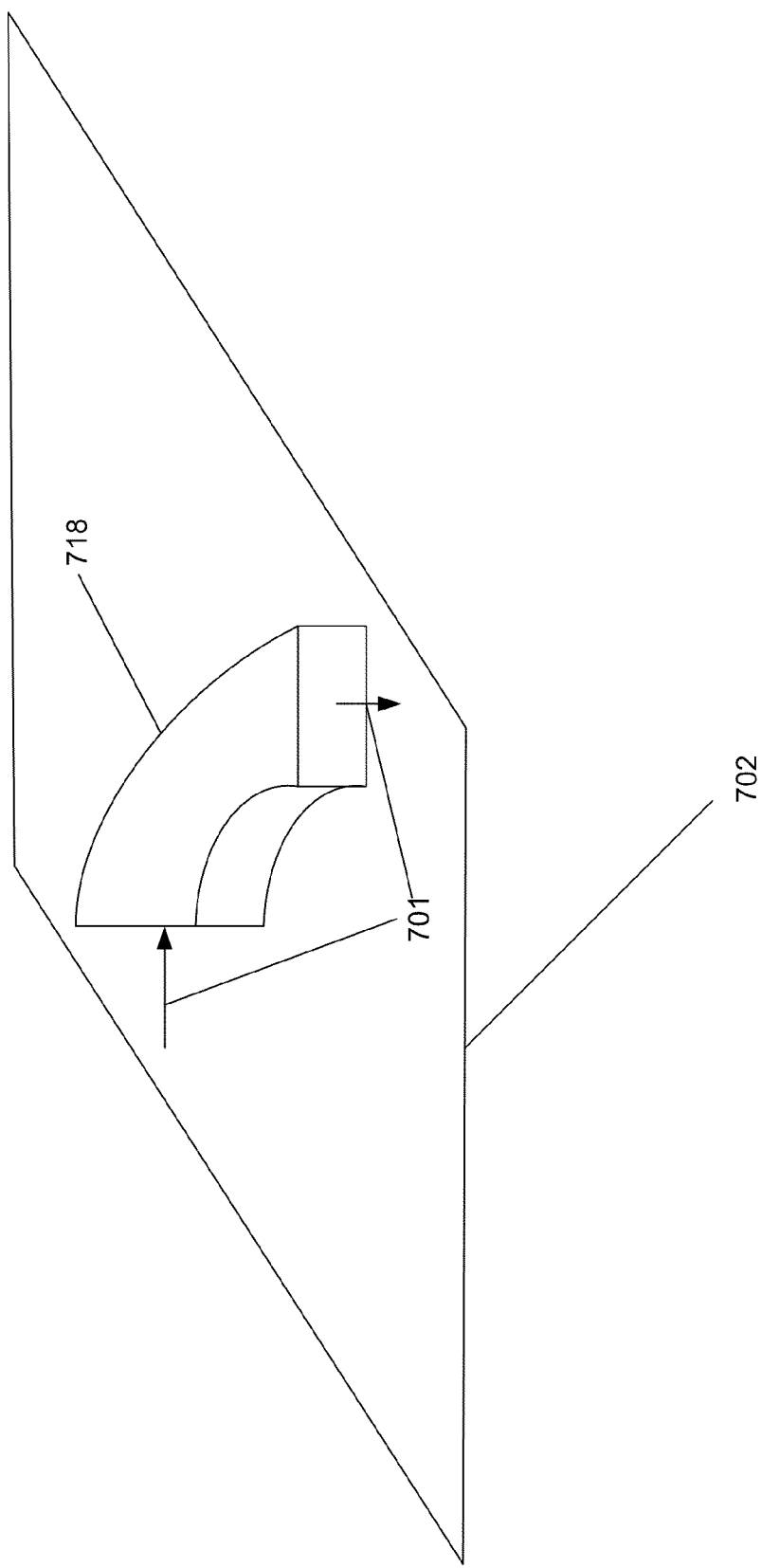

FIGS. 7a to 7c illustrate examples of waveplate waveguide and/or delay waveguide structures consistent with additional aspects of the present disclosure. In particular, FIG. 7a illustrates a waveguide 710, which is provided on substrate 702. Waveguide 712 has a width w that narrows in a direction 711 that is transverse to direction 701 of propagation of the optical signal through the waveplate waveguides discussed above. FIG. 7b illustrates a waveguide 714 having a recessed portion 716, and FIG. 7c illustrates a curved or arcuate waveguide 718. Waveguide 714 may also be provided on substrate 702 (not shown for convenience in FIG. 7b).

Preferably, the dimensions of waveguides 710, 714, and 718 are such that each exhibits birefringence, in which the refractive indices associated with the eigen modes differ from one another. In addition, although each of waveplate waveguides in FIGS. 3a, 4a, and 6a may have the same shape, e.g., each may have a shape corresponding to that shown in FIG. 7a, it is understood that each may have a different shape, e.g., one may have the shape shown in FIG. 7a, while another has a shape shown in FIG. 7b.

Figure 8:
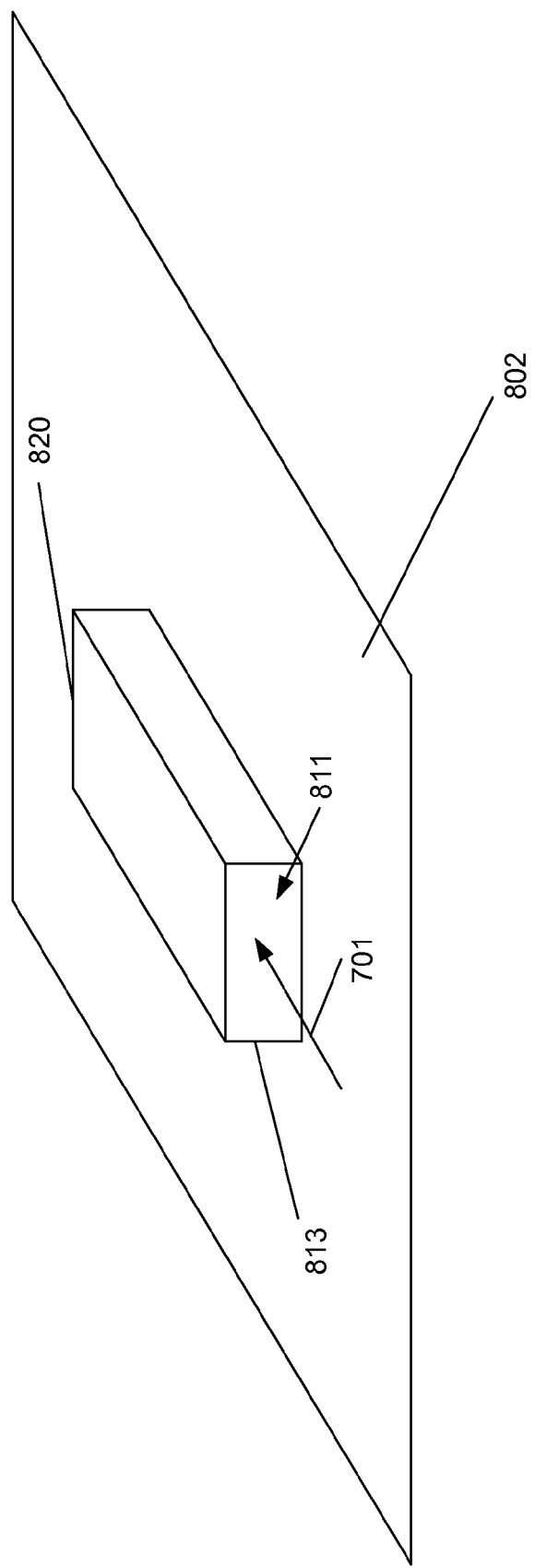
FIG. 8 illustrates a perspective view of a waveguide consistent with a further aspect of the present disclosure.

FIG. 8 illustrates an example of a rectangular waveguide 820, which may be provided on substrate 802. Each of the input, output, and delay waveguides discussed above may be implemented as rectangular waveguides similar to that shown in FIG. 8. Such waveguides have a rectangular cross-section 811 in a plane 813 transverse to a direction of propagation 810 of the optical signal through the delay waveguides.

As noted above, by providing a rotator having multiple stages of delay and waveplate waveguides greater tolerance to angular deviations can be achieved, thereby yielding improved performance.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus, comprising:
   a substrate;
   an input waveguide provided on the substrate, the input waveguide receiving an optical signal, the optical signal having a first polarization in the input waveguide;
   a first waveplate waveguide provided on the substrate, the first waveplate waveguide receiving the optical signal, the first waveplate waveguide having first and second waveplate eigen modes, which are oriented along first and second directions, respectively;
   a delay waveguide provided on the substrate, the first waveplate waveguide supplying the optical signal to the first delay waveguide, the delay waveguide having first and second delay eigen modes, which are oriented along third and fourth directions, respectively;
   a second waveplate waveguide provided on the substrate, the second waveplate waveguide receiving the optical signal from the first delay waveguide, the second waveplate waveguide having the first and second waveplate eigen modes; and
   an output waveguide provided on the substrate, the output waveguide supplying the optical signal, such that the optical signal in the output waveguide has a second polarization different than the first polarization
   wherein the delay waveguide is one of a plurality of delay waveguides provided along an optical path in which the optical signal propagates from the input waveguide to the output waveguide.

2. An apparatus in accordance with claim 1, wherein the first and second waveplate waveguides are first and second ones of a plurality of waveplate waveguides provided along an optical path in which the optical signal propagates from the input waveguide to the output waveguide.

3. An apparatus in accordance with claim 2, wherein a cross-section of each of the plurality of waveplate waveguides in a plane transverse to a direction of propagation of the optical signal through the plurality of waveplate waveguides has a different shape.

4. An apparatus in accordance with claim 1, wherein the first polarization is a TE polarization and the second polarization is a TM polarization.

5. An apparatus in accordance with claim 1, wherein the first polarization is a TM polarization and the second polarization is a TE polarization.

6. An apparatus in accordance with claim 1, wherein the first polarization is rotated substantially 90 degrees relative to the second polarization.

7. An apparatus in accordance with claim 1, wherein the delay waveguide has a rectangular cross section in a plane transverse to a direction of propagation of the optical signal through the delay waveguide.

8. An apparatus in accordance with claim 1, wherein the first and second waveplate waveguides have a width, the width narrowing in a direction transverse to a direction of propagation of the optical signal through the first and second waveplate waveguides, such that a first mode index associated with the first eigen mode is different than a second mode index associated with the second eigen mode.

9. An apparatus in accordance with claim 1, wherein each of the first and second waveplate waveguides includes a recessed portion, such that a first mode index associated with the first eigen mode is different than a second mode index associated with the second eigen mode.

10. An apparatus in accordance with claim 1, wherein the first waveplate waveguide has a first phase length and the second waveplate waveguide has a second phase length, the first phase length being different than the second phase length.

11. An apparatus in accordance with claim 1, wherein a cross-section of each of the plurality of delay waveguides in a plane transverse to a direction of propagation of the optical signal through the plurality of delay waveguides has a different shape.

12. An apparatus in accordance with claim 1, wherein a cross-section of each of the plurality of delay waveguides in a plane transverse to a direction of propagation of the optical signal through the plurality of delay waveguides has the same shape.

13. An apparatus in accordance with claim 1, wherein the input and output waveguides have eigen modes which are oriented at directions different than the first and second directions.

14. An apparatus in accordance with claim 13, wherein the input and output waveguides have eigen modes which are oriented along the third and fourth directions.

15. An apparatus, comprising:
   a substrate;
   an input waveguide provided on the substrate, the input waveguide receiving an optical signal, the optical signal having a first polarization in the input waveguide;
   a first waveplate waveguide provided on the substrate, the first waveplate waveguide receiving the optical signal, the first waveplate waveguide having first and second waveplate eigen modes, which are oriented along first and second directions, respectively;
   a delay waveguide provided on the substrate, the first waveplate waveguide supplying the optical signal to the delay waveguide, the delay waveguide having first and second delay eigen modes, which are oriented along third and fourth directions, respectively;
   a second waveplate waveguide provided on the substrate, the second waveplate waveguide receiving the optical signal from the delay waveguide, the second waveplate waveguide having the first and second waveplate eigen modes; and an output waveguide provided on the substrate, the output waveguide supplying the optical signal, such that the optical signal in the output waveguide has a second polarization different than the first polarization, wherein each of the first and second waveplate waveguides is curved, such that a first mode index associated with the first eigen mode is different than a second mode index associated with the second eigen mode.

16. An apparatus comprising:

a substrate;

an input waveguide provided on the substrate, the input waveguide receiving an optical signal, the optical signal having a first polarization in the input waveguide;

a first waveplate waveguide provided on the substrate, the first waveplate waveguide receiving the optical signal, the first waveplate waveguide having first and second waveplate eigen modes, which are oriented along first and second directions, respectively;

a delay waveguide provided on the substrate, the first waveplate waveguide supplying the optical signal to the delay waveguide, the delay waveguide having first and second delay eigen modes, which are oriented along third and fourth directions, respectively;

a second waveplate waveguide provided on the substrate, the second waveplate waveguide receiving the optical signal from the delay waveguide, the second waveplate waveguide having the first and second waveplate eigen modes; and an output waveguide provided on the substrate, the output waveguide supplying the optical signal, such that the optical signal in the output waveguide has a second polarization different than the first polarization, wherein an angle between one of the first and second directions and one of the third and fourth directions is substantially equal to 45 degrees.

17. An apparatus, comprising:

a first waveplate slab receiving an optical signal, the first waveplate slab having first and second waveplate eigen modes, which are oriented along first and second directions, respectively;

a delay slab, the first waveplate slab supplying the optical signal to the first delay slab, the delay slab having first and second delay eigen modes, which are oriented along third and fourth directions, respectively;

a second waveplate slab receiving the optical signal from the first delay slab, the second waveplate slab having the first and second waveplate eigen modes, wherein the second waveplate slab supplies the optical signal with a second polarization different than the first polarization, and the delay slab is one of a plurality of delay slabs provided along an optical path in which the optical signal propagates from the first waveplate slab to the second waveplate slab.

18. An apparatus in accordance with claim 17, wherein the first and second waveplate slabs are first and second ones of a plurality of waveplate slabs provided along an optical path including the plurality of waveplate slabs and the delay slab.

19. An apparatus in accordance with claim 17, wherein the first polarization is a TE polarization and the second polarization is a TM polarization.

20. An apparatus in accordance with claim 17, wherein the first polarization is a TM polarization and the second polarization is a TE polarization.

21. An apparatus in accordance with claim 17, wherein the first polarization is rotated substantially 90 degrees relative to the second polarization.

\* \* \* \* \*